(12) United States Patent
Agirman et al.

(10) Patent No.: US 10,654,682 B2
(45) Date of Patent: May 19, 2020

(54) CONVEYANCE SYSTEM HAVING PARALLELED DRIVES

(71) Applicant: Otis Elevator Company, Farmington, CT (US)

(72) Inventors: Ismail Agirman, Southington, CT (US); Jeffrey M. Izard, Bolton, CT (US); HanJong Kim, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 382 days.

(21) Appl. No.: 15/537,037

(22) PCT Filed: Dec. 9, 2015

(86) PCT No.: PCT/US2015/064627
§ 371 (c)(1),
(2) Date: Jun. 16, 2017

(87) PCT Pub. No.: WO2016/100026
PCT Pub. Date: Jun. 23, 2016

(65) Prior Publication Data
US 2017/0369276 A1  Dec. 28, 2017

Related U.S. Application Data

(60) Provisional application No. 62/093,130, filed on Dec. 17, 2014.

(51) Int. Cl.
*B66B 1/30* (2006.01)
*H02M 5/458* (2006.01)
(Continued)

(52) U.S. Cl.
CPC ............... *B66B 1/308* (2013.01); *H02M 1/12* (2013.01); *H02M 5/4585* (2013.01);
(Continued)

(58) Field of Classification Search
CPC .................. B66B 1/308; H02M 1/12
(Continued)

(56) References Cited

U.S. PATENT DOCUMENTS 4,349,772 A  9/1982  Weiss
5,016,158 A  5/1991  Matsui et al.
(Continued)

FOREIGN PATENT DOCUMENTS

CN  101359896 A  2/2009
CN  102132480 A  7/2011
(Continued)

OTHER PUBLICATIONS

Grandi, G. et al., "Synchronized PWM Control of Asymmetrical Dual-Inverter Fed Open-End Winding Traction Drive", University of Bologna, Italy, Power Engineering Institute of the Academy of Sciences of Moldova, Aug. 15, 2012, 8pgs.
(Continued)

*Primary Examiner* — David S Warren
(74) *Attorney, Agent, or Firm* — Cantor Colburn LLP

(57) ABSTRACT

A conveyance system includes a machine having a motor; a source of AC power; a drive system coupled to the source of AC power, the drive system to provide multi-phase drive signals to the motor, the drive system including: a first drive having a first converter and a first inverter, the first convertor including a first positive DC bus and a first negative DC bus; a second drive having a second converter and a second inverter, the second convertor including a second positive DC bus and a second negative DC bus; wherein the first positive DC bus and the second DC positive bus are electrically connected and the first negative DC bus and the second negative DC bus are electrically connected.

18 Claims, 11 Drawing Sheets

(51) Int. Cl.
*H02M 7/487* (2007.01)
*H02M 7/49* (2007.01)
*H02P 25/22* (2006.01)
*H02M 1/12* (2006.01)
*H02M 1/00* (2006.01)
*H02P 27/14* (2006.01)
*H02P 4/00* (2006.01)

(52) U.S. Cl.
CPC ............. *H02M 7/487* (2013.01); *H02M 7/49* (2013.01); *H02P 25/22* (2013.01); H02M 2001/0067 (2013.01); H02P 4/00 (2013.01); H02P 27/14 (2013.01)

(58) Field of Classification Search
USPC ........................................................ 187/277
See application file for complete search history.

(56) References Cited

U.S. PATENT DOCUMENTS

| | | | |
|---|---|---|---|
| 5,450,309 A | 9/1995 | Rohner | |
| 5,910,892 A | 6/1999 | Lyons et al. | |
| 6,014,323 A * | 1/2000 | Aiello | H02M 5/271 323/361 |
| 6,297,616 B1 * | 10/2001 | Kubo | H02J 7/0027 320/116 |
| 6,788,559 B2 | 9/2004 | Sheng et al. | |
| 7,068,525 B2 | 6/2006 | Kraus et al. | |
| 7,327,588 B2 | 2/2008 | Ollila | |
| 7,499,297 B2 * | 3/2009 | Stulz | H02M 5/458 363/37 |
| 7,667,351 B2 | 2/2010 | Marwali et al. | |
| 7,738,267 B1 | 6/2010 | Tallam et al. | |
| 7,773,396 B2 | 8/2010 | Ollila et al. | |
| 7,872,885 B2 | 1/2011 | Itkonen et al. | |
| 8,107,267 B2 | 1/2012 | Tallam et al. | |
| 8,172,042 B2 * | 5/2012 | Wesson | B66B 1/308 187/290 |
| 8,188,694 B2 | 5/2012 | Tallam et al. | |
| 8,335,081 B2 * | 12/2012 | Weiss | H05K 7/20163 361/694 |
| 8,569,987 B2 * | 10/2013 | Winterhalter | H02P 27/06 318/494 |
| 8,710,782 B2 | 4/2014 | Tallam et al. | |
| 8,760,896 B2 * | 6/2014 | Oka | H02P 13/00 363/127 |
| 8,787,048 B2 | 7/2014 | Moreno-Casta et al. | |
| 8,841,872 B2 | 9/2014 | Pasuri et al. | |
| 9,084,376 B2 * | 7/2015 | Weiss | H05K 7/20163 |
| 9,543,884 B2 * | 1/2017 | Hong | H02P 27/08 |
| 9,906,183 B1 * | 2/2018 | Agirman | H02P 27/08 |
| 10,008,917 B2 * | 6/2018 | Agirman | B66B 1/302 |
| 10,218,262 B1 * | 2/2019 | Agirman | H02M 1/4216 |
| 10,221,038 B2 * | 3/2019 | Agirman | H02P 27/08 |
| 10,294,070 B2 * | 5/2019 | Jacobs | B66B 1/308 |
| 2004/0062004 A1 * | 4/2004 | Pfeifer | F28F 3/12 361/699 |
| 2004/0062005 A1 * | 4/2004 | Pfeifer | F28F 3/12 361/699 |
| 2004/0182652 A1 | 9/2004 | Ammon et al. | |
| 2005/0224296 A1 * | 10/2005 | Smith | B66B 1/302 187/277 |
| 2006/0034364 A1 * | 2/2006 | Breitzmann | H02M 7/53871 375/238 |
| 2006/0066112 A1 * | 3/2006 | Geis | F01D 15/08 290/52 |
| 2008/0042606 A1 * | 2/2008 | Chen | B60L 15/025 318/474 |
| 2008/0117657 A1 * | 5/2008 | Imazu | H02M 7/53803 363/41 |
| 2009/0218175 A1 * | 9/2009 | Wesson | B66B 1/302 187/290 |
| 2009/0301819 A1 * | 12/2009 | Agirman | B66B 1/308 187/290 |
| 2010/0044160 A1 * | 2/2010 | Agirman | B66B 5/027 187/290 |
| 2010/0065380 A1 * | 3/2010 | Chen | B66B 1/302 187/290 |
| 2011/0247900 A1 * | 10/2011 | Blasko | B66B 1/302 187/247 |
| 2012/0013285 A1 * | 1/2012 | Kasunich | H02P 6/34 318/490 |
| 2012/0014062 A1 * | 1/2012 | Siracki | H05K 7/20145 361/692 |
| 2012/0014063 A1 * | 1/2012 | Weiss | H05K 7/20163 361/697 |
| 2012/0014154 A1 * | 1/2012 | Siracki | H05K 7/20918 363/141 |
| 2012/0032622 A1 * | 2/2012 | Lipo | H02P 21/0089 318/400.27 |
| 2012/0033472 A1 * | 2/2012 | Oka | H02P 13/00 363/127 |
| 2012/0161525 A1 * | 6/2012 | Hong | H02P 27/08 307/73 |
| 2012/0261217 A1 * | 10/2012 | Agirman | B66B 5/027 187/290 |
| 2013/0049478 A1 * | 2/2013 | Wagoner | H02M 1/36 307/82 |
| 2013/0100611 A1 * | 4/2013 | Weiss | H05K 7/20163 361/690 |
| 2013/0112507 A1 * | 5/2013 | Marvin | B66B 1/302 187/289 |
| 2013/0121041 A1 * | 5/2013 | Schroeder | B60L 15/007 363/37 |
| 2013/0154529 A1 * | 6/2013 | Kasunich | H02P 6/34 318/400.21 |
| 2013/0234641 A1 | 9/2013 | Li et al. | |
| 2014/0103724 A1 * | 4/2014 | Wagoner | H02J 7/34 307/44 |
| 2014/0145658 A1 | 5/2014 | Heo et al. | |
| 2015/0145481 A1 * | 5/2015 | Yamauchi | B60L 3/0046 320/117 |
| 2015/0194902 A1 * | 7/2015 | Tian | H02M 5/458 363/37 |
| 2015/0340961 A1 * | 11/2015 | Wen | H02M 5/458 363/37 |
| 2016/0308474 A1 * | 10/2016 | Millett | B66B 1/302 |
| 2016/0311644 A1 * | 10/2016 | Agirman | B66B 1/302 |
| 2016/0311645 A1 * | 10/2016 | Agirman | H02P 27/08 |
| 2017/0005562 A1 * | 1/2017 | Agirman | B66B 1/302 |
| 2017/0029242 A1 * | 2/2017 | Agirman | B66B 1/302 |
| 2017/0369276 A1 * | 12/2017 | Agirman | H02M 1/12 |
| 2018/0079515 A1 * | 3/2018 | Harwood | H02J 7/34 |
| 2018/0233908 A1 * | 8/2018 | Chik | H02J 3/00 |
| 2019/0131882 A1 * | 5/2019 | Agirman | B66B 1/00 |
| 2019/0214817 A1 * | 7/2019 | Teichmann | H02J 1/10 |

FOREIGN PATENT DOCUMENTS

| | | |
|---|---|---|
| JP | 2009050063 A | 3/2009 |
| WO | 2014125445 A2 | 8/2014 |

OTHER PUBLICATIONS

Griva, Giovanni, et al., "Combined synchronised PWM for symmetrical split-phase drives with low switching frequency", Abstract, Power Electronics Specialists Conference, 2008. PESC 2008. IEEE, 2pgs.

ISR/WO for application PCT/2015064627, Issued Mar. 15, 2016, 10pgs.

Oleschuk, Valentin et al., "Multifunctional Six-Phase Motor Drives with Algorithms of Synchronized PWM" Abstract, IEEE Industrial Electronics, IECON 2006—32nd Annual Conference on Nov. 6-10, 2006, 3pgs.

Chinese Office Action for application CN 201580068990.5, dated Jul. 24, 2019, 6 pages.

\* cited by examiner

CONVEYANCE SYSTEM HAVING PARALLELED DRIVES

TECHNICAL FIELD

The subject matter disclosed herein relates generally to conveyance systems, and more particularly to a conveyance system having drives arranged in an electrically parallel manner.

BACKGROUND

Conveyance systems, such as elevator systems, use machines to impart force to a car carrying passengers. The machines employed may need to provide varying power levels depending on the application. When an elevator requires a large elevator duty or load, a drive needs be provided to power the elevator machine. Often, a high power drive may not exist, which results in high design costs and lengthy development time to manufacture a suitable drive. Even if a single, large drive exists in the marketplace, costs associated with a single, large drive may be excessive due to specialty components, component availability, etc.

BRIEF SUMMARY

According to an exemplary embodiment, a conveyance system includes a machine having a motor; a source of AC power; a drive system coupled to the source of AC power, the drive system to provide multi-phase drive signals to the motor, the drive system including: a first drive having a first converter and a first inverter, the first convertor including a first positive DC bus and a first negative DC bus; a second drive having a second converter and a second inverter, the second convertor including a second positive DC bus and a second negative DC bus; wherein the first positive DC bus and the second DC positive bus are electrically connected and the first negative DC bus and the second negative DC bus are electrically connected.

In addition to one or more of the features described above or below, or as an alternative, further embodiments could include wherein the first converter includes a two level, three phase converter, the first inverter includes a two level, three phase inverter, the second converter includes a two level, three phase converter, and the second inverter includes a two level, three phase inverter.

In addition to one or more of the features described above or below, or as an alternative, further embodiments could include an inductive interface coupled to the first inverter and the second inverter, the inductive interface including a plurality of inductive elements, the inductive interface combining drive signals from the first inverter and the second inverter for each phase of the drive signals; wherein the motor receives the drive signals from the inductive interface.

In addition to one or more of the features described above or below, or as an alternative, further embodiments could include wherein the first converter includes a three level, three phase converter, the first inverter includes a three level, three phase inverter, the second converter includes a three level, three phase converter, and the second inverter includes a three level, three phase inverter.

In addition to one or more of the features described above or below, or as an alternative, further embodiments could include wherein the first converter includes a first converter neutral point, the first inverter includes a first inverter neutral point, the second converter includes a second converter neutral point, the second inverter includes a second inverter neutral point, the first converter neutral point electrically connected to the first inverter neutral point and the second converter neutral point electrically connected to the second inverter neutral point, wherein the first converter neutral point is not electrically connected to the second inverter neutral point and the first inverter neutral point is not electrically connected to the second converter neutral point.

In addition to one or more of the features described above or below, or as an alternative, further embodiments could include wherein the first converter includes a first converter neutral point, the first inverter includes a first inverter neutral point, the second converter includes a second converter neutral point, the second inverter includes a second inverter neutral point, wherein at least one of (i) the first converter neutral point is electrically connected to the second inverter neutral point and (ii) the first inverter neutral point is electrically connected to the second converter neutral point.

In addition to one or more of the features described above or below, or as an alternative, further embodiments could include a neutral point link electrically connecting the first converter neutral point to the first inverter neutral point.

In addition to one or more of the features described above or below, or as an alternative, further embodiments could include a second neutral point link electrically connecting the second converter neutral point to the second inverter neutral point.

In addition to one or more of the features described above or below, or as an alternative, further embodiments could include wherein the drive system comprises a first drive controller to provide a first control signal to the first drive and a second drive controller to provide a second control signal to the second drive.

In addition to one or more of the features described above or below, or as an alternative, further embodiments could include wherein the first drive controller communicates a location of a reference point in the first control signal to the second drive controller, the second drive controller adjusting a period of the second control signal in response to the location of the reference point in the first control signal.

In addition to one or more of the features described above or below, or as an alternative, further embodiments could include wherein the reference point in the first control signal corresponds to point in a PWM control signal.

In addition to one or more of the features described above or below, or as an alternative, further embodiments could include the second drive controller adjusts the period of the second control signal using a phase locked loop.

In addition to one or more of the features described above or below, or as an alternative, further embodiments could include wherein the first converter is a three level, three phase converter, the first inverter is a two level, three phase inverter, the second converter is a three level, three phase converter, the second inverter is a two level, three phase inverter and the motor is a six phase motor.

In addition to one or more of the features described above or below, or as an alternative, further embodiments could include a second drive system coupled to the source of AC power, the second drive system to provide multi-phase drive signals to the motor, the second drive system including: a further first drive having a further first converter and a further first inverter, the further first convertor including a further first positive DC bus and a further first negative DC bus; a further second drive having a further second converter and a further second inverter, the further second convertor including a further second positive DC bus and a further second negative DC bus; wherein the further first positive DC bus and the further second DC positive bus are electrically connected and the further first negative DC bus and the further second negative DC bus are electrically connected; the motor to receive the drive signals from the further first drive and the further second drive.

In addition to one or more of the features described above or below, or as an alternative, further embodiments could include a first inductive interface coupled to the first inverter and the second inverter, the first inductive interface including a plurality of inductive elements, the first inductive interface combining drive signals from the first inverter and the second inverter for each phase of the drive signals; and a second inductive interface coupled to the further first inverter and the further second inverter, the second inductive interface including a plurality of inductive elements, the second inductive interface combining drive signals from the further first inverter and the further second inverter for each phase of the drive signals; wherein the motor receives drive signals from the first inductive interface and the second inductive interface.

In addition to one or more of the features described above or below, or as an alternative, further embodiments could include wherein the first inductive interface generates three phase drive signals; the second inductive interface generates three phase drive signals; and the motor has at least six phases.

In addition to one or more of the features described above or below, or as an alternative, further embodiments could include wherein the motor is a 6 phase motor, the first drive system providing three phase drive signals and the second drive system providing an additional three phase drive signals.

In addition to one or more of the features described above or below, or as an alternative, further embodiments could include wherein the number of drive systems comprises N drive systems, the motor being a 3N phase motor.

In addition to one or more of the features described above or below, or as an alternative, further embodiments could include an elevator car; the machine to control motion of the elevator car.

Other aspects, features, and techniques of embodiments will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
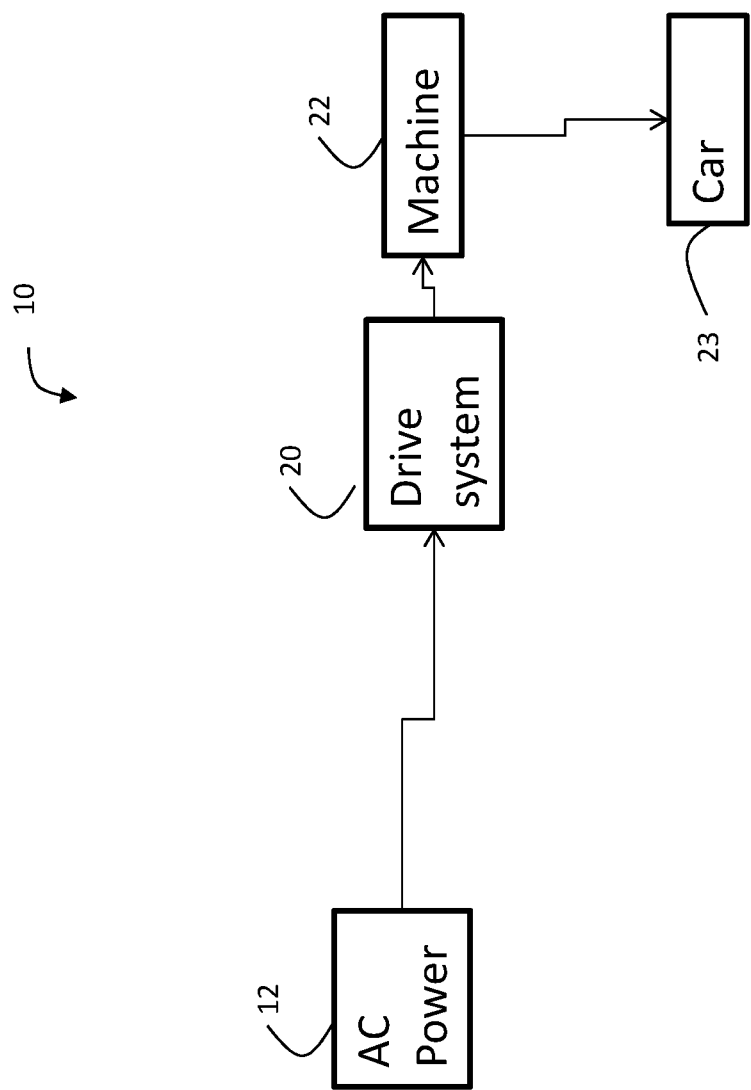
FIG. 1 is a block diagram of components of an elevator system in an exemplary embodiment.

FIG. 1 is a block diagram of components of an elevator system 10 in an exemplary embodiment. Although embodiments are described with respect to an elevator system, it is understood that embodiments may be applied to other conveyance systems (e.g., trains, automobiles, marine). Elevator system 10 includes a source of AC power 12, such as an electrical main line (e.g., 440 volt, 3-phase). The AC power 12 is provided to a regenerative drive system 20. As described in further detail herein, drive system 20 includes a plurality of drives arranged in a parallel electrical configuration. Each drive may include a converter to convert the AC power 12 to a DC voltage. Each drive may include an inverter to convert the DC voltage to multiphase, AC drive signals. Drive signals from the drive system 20 are supplied to a multiphase machine 22 to impart motion to elevator car 23. In an exemplary embodiment, machine 22 includes a multiphase, permanent magnet synchronous motor.

Figure 2:
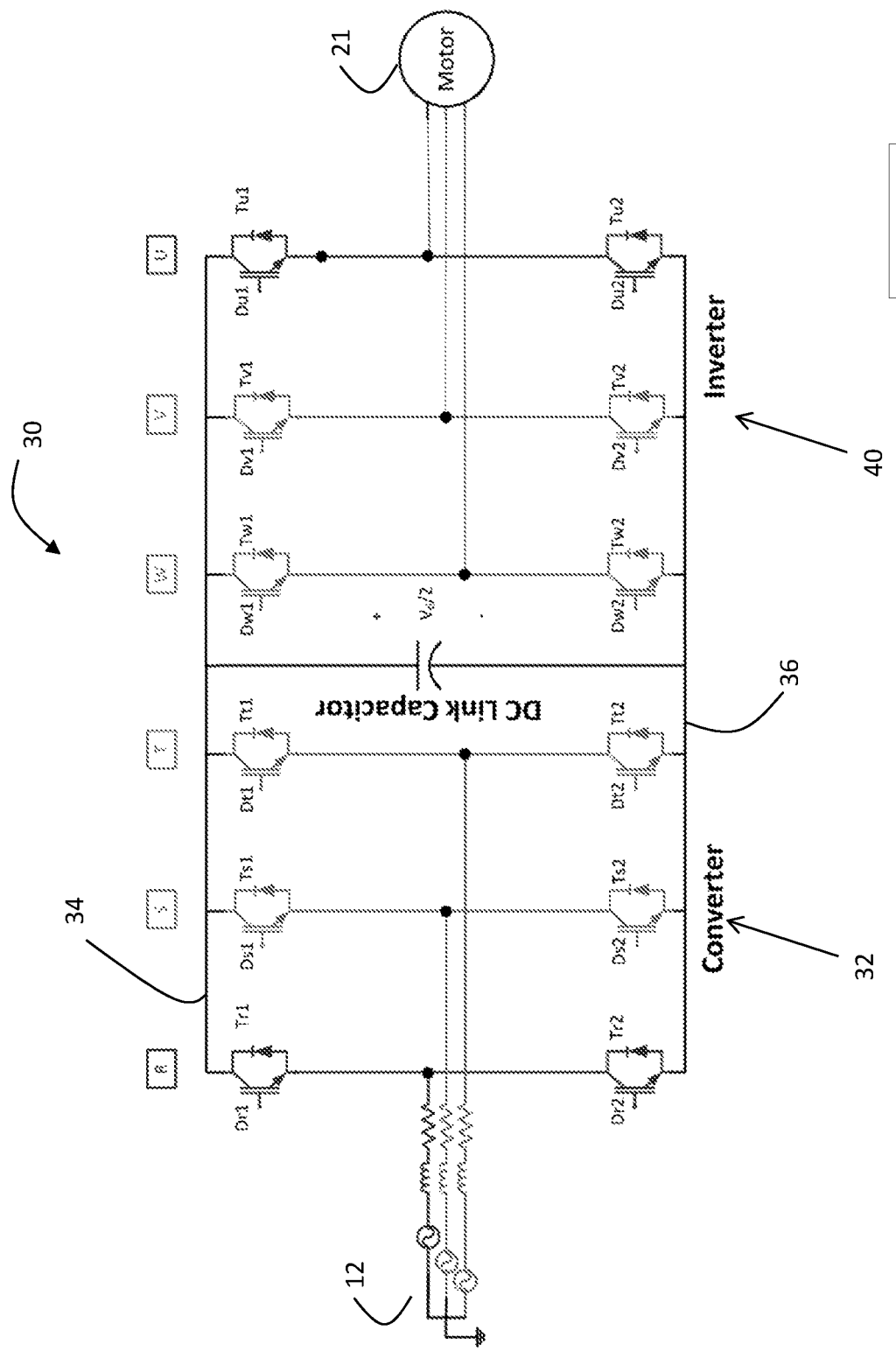
FIG. 2 is a block diagram of a 2 level, 3 phase drive used in an exemplary embodiment.

FIG. 2 is a block diagram of a 2 level, 3 phase drive 30 used in exemplary embodiments. Drive 30 includes a converter 32 having 3 phase legs, R, S and T. Each phase leg, R, S and T, includes switches controlled by control signals from a drive controller to convert AC power to DC power across a first DC bus 34 (e.g., positive) and a second DC bus 36 (e.g., negative). Drive 30 includes an inverter 40 having 3 phase legs, W, V, U. Each phase leg, W, V, and U, includes switches controlled by control signals from a drive controller to convert DC power across the DC bus 34, 36 to AC drive signals to power motor 21, which is part of machine 22.

Figure 3A:
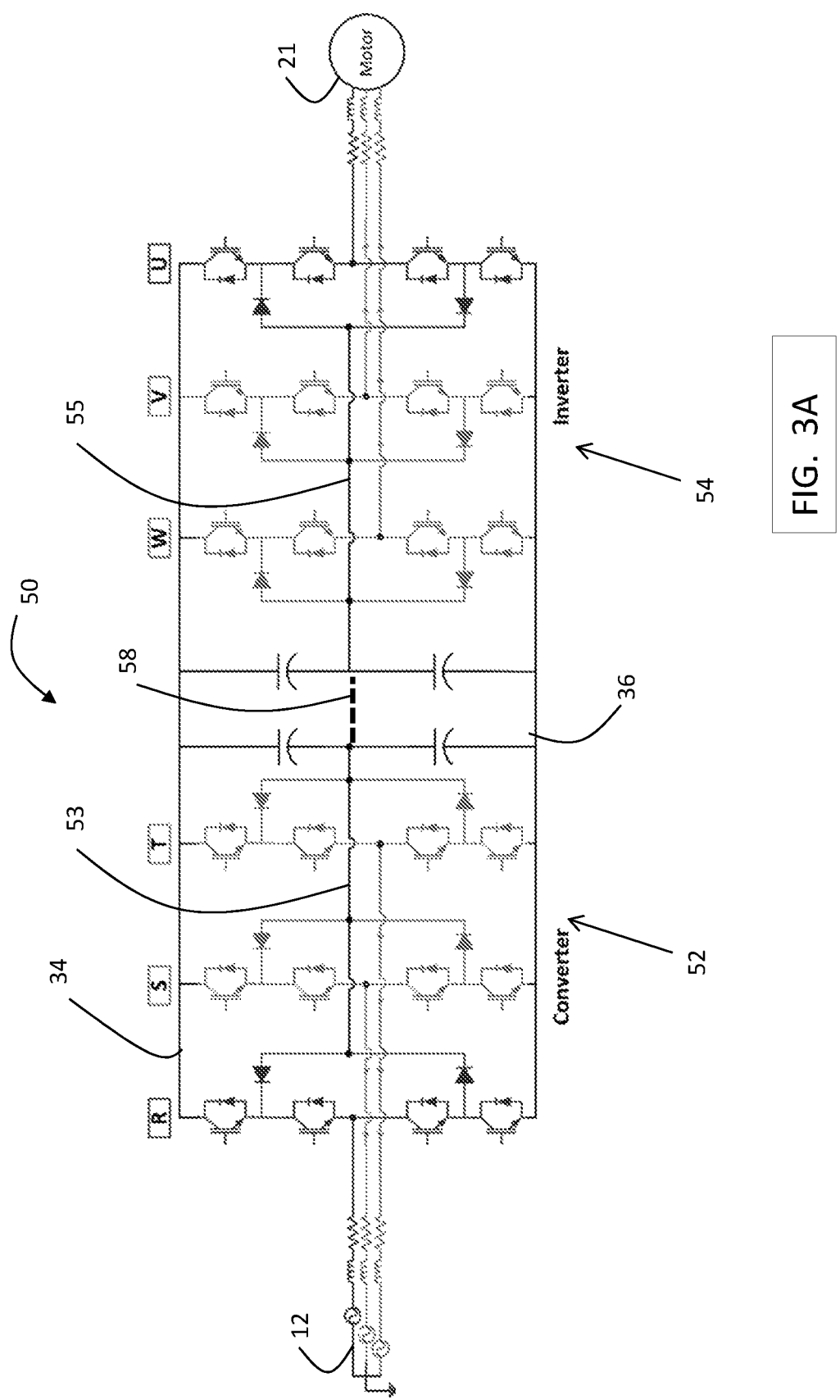
FIG. 3A is a block diagram of a 3 level, 3 phase drive used in an exemplary embodiment.

FIG. 3A is a block diagram of a 3 level, 3 phase drive 50 used in an exemplary embodiment. Drive 50 includes a converter 52 having 3 phase legs, R, S and T. Each phase leg, R, S and T, includes switches controlled by control signals from a drive controller to convert AC power to DC power across a first DC bus 34 (e.g., positive) and a second DC bus 36 (e.g., negative). Converter 52 is a neutral point clamped (NPC) converter, in which the neutral points in each phase leg R, S, and T are connected at a common, converter neutral point 53. Drive 50 includes an inverter 54 having 3 phase legs, W, V, U. Each phase leg, W, V, and U, includes switches controlled by control signals from a drive controller to convert DC power across the DC bus 34, 36 to AC drive signals to power motor 21, which is part of machine 22. Inverter 54 is a neutral point clamped (NPC) inverter, in which the neutral points in each phase leg W, V, and U are connected at a common, inverter neutral point 55. An optional neutral point link 58 may be used to electrically connect the converter neutral point 53 to the inverter neutral point 55.

Figure 3B:
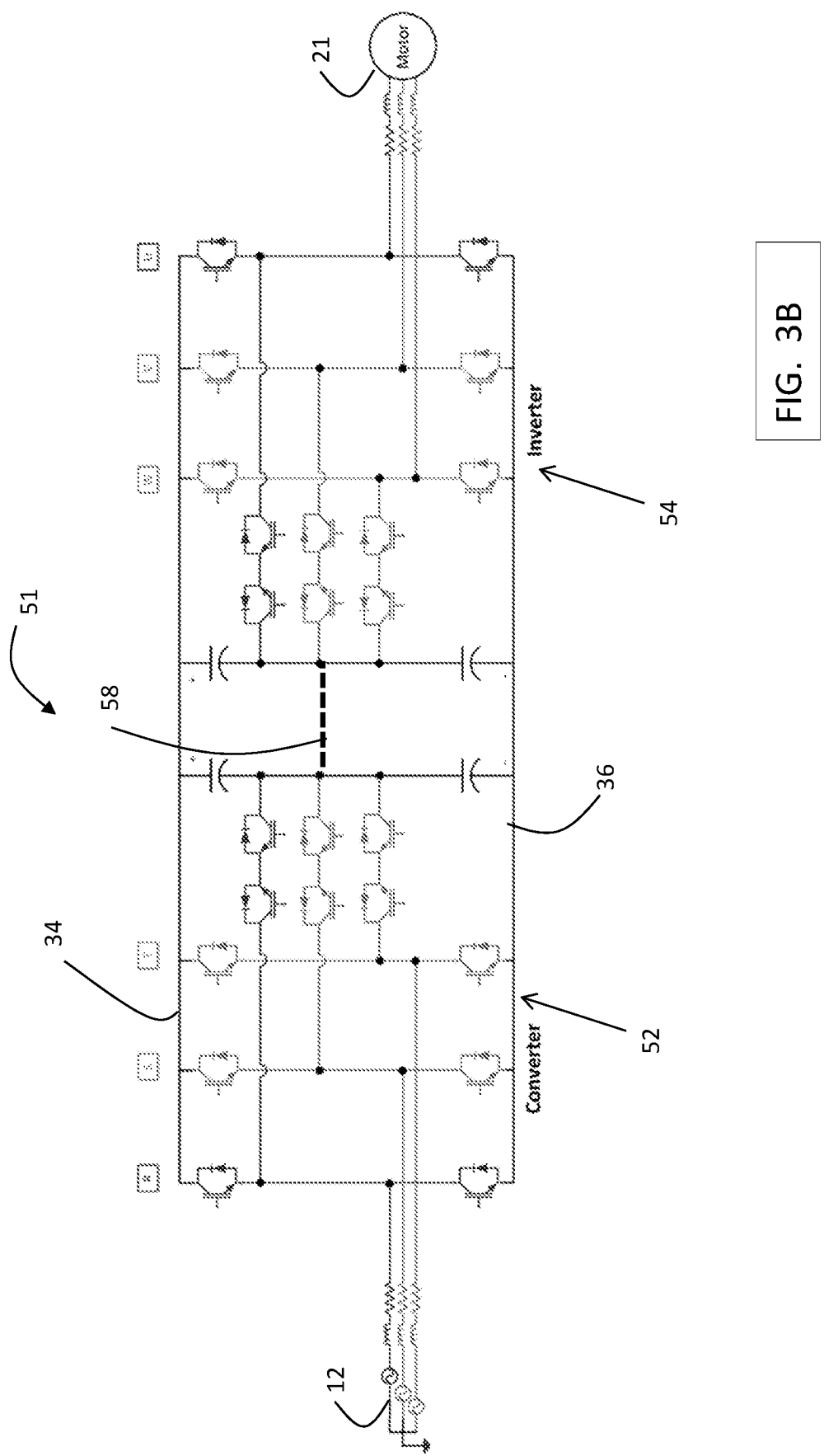
FIG. 3B is a block diagram of a 3 level, 3 phase drive used in an exemplary embodiment.

FIG. 3B is a block diagram of a 3 level, 3 phase drive 51 used in an exemplary embodiment. Drive 51 includes a converter 52 having 3 phase legs, R, S and T. Each phase leg, R, S and T, includes switches controlled by control signals from a drive controller to convert AC power to DC power across a first DC bus 34 (e.g., positive) and a second DC bus 36 (e.g., negative). Converter 52 is a T-type converter. Drive 51 includes an inverter 54 having 3 phase legs, W, V, U. Each phase leg, W, V, and U, includes switches controlled by control signals from a drive controller to convert DC power across the DC bus 34, 36 to AC drive signals to power motor 21, which is part of machine 22. Inverter 54 is a T-type inverter. An optional neutral point link 58 may be used to electrically connect a converter neutral point to an inverter neutral point.

Figure 3C:
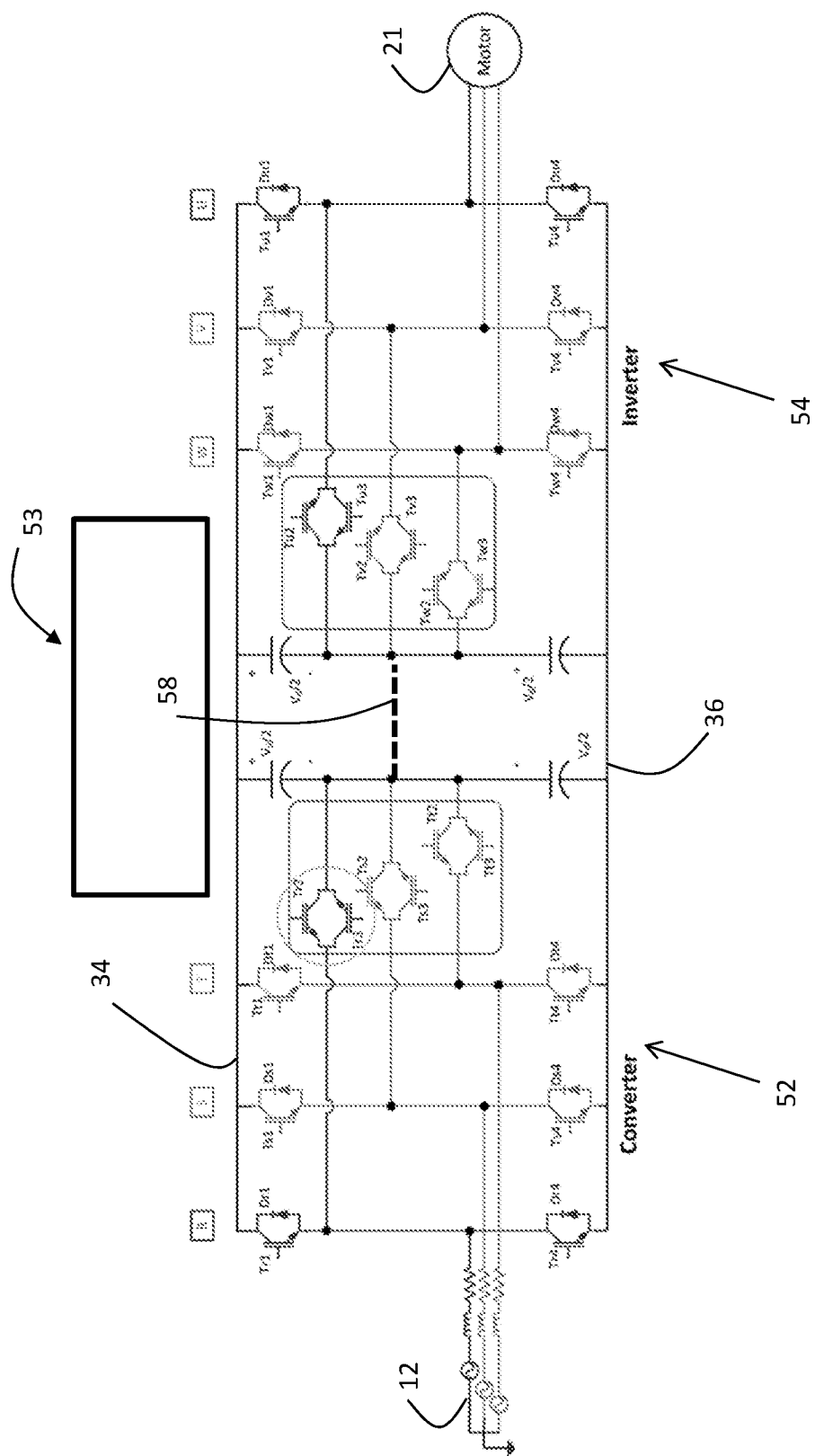
FIG. 3C is a block diagram of a 3 level, 3 phase drive used in an exemplary embodiment.

FIG. 3C is a block diagram of a 3 level, 3 phase drive 53 used in an exemplary embodiment. Drive 53 includes a converter 52 having 3 phase legs, R, S and T. Each phase leg, R, S and T, includes switches controlled by control signals from a drive controller to convert AC power to DC power across a first DC bus 34 (e.g., positive) and a second DC bus 36 (e.g., negative). Converter 52 is an AT-type converter. Drive 53 includes an inverter 54 having 3 phase legs, W, V, U. Each phase leg, W, V, and U, includes switches controlled by control signals from a drive controller to convert DC power across the DC bus 34, 36 to AC drive signals to power motor 21, which is part of machine 22. Inverter 53 is an AT-type inverter. An optional neutral point link 58 may be used to electrically connect a converter neutral point to an inverter neutral point.

Figure 4:
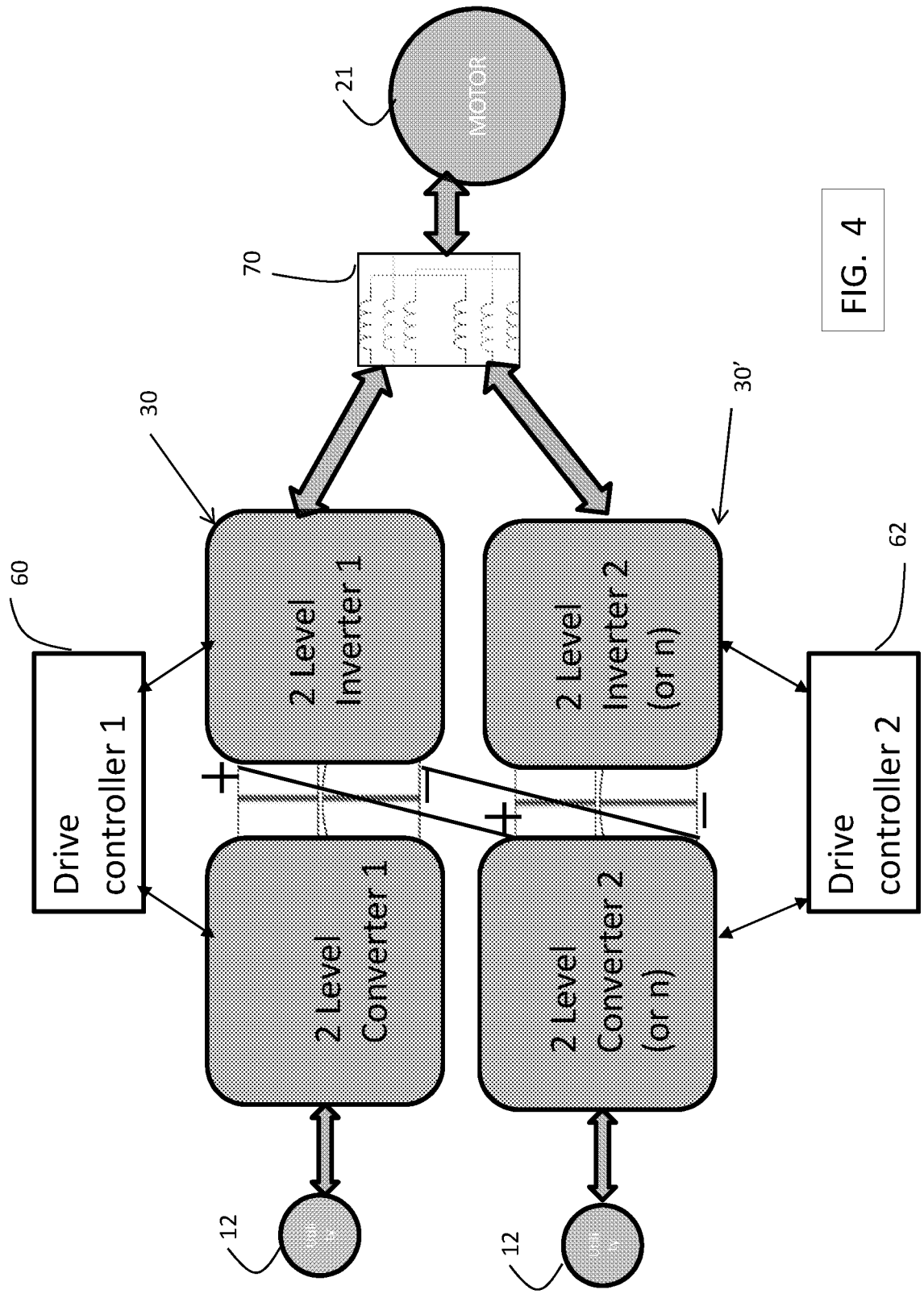
FIG. 4 is a block diagram of a drive system including paralleled drives in an exemplary embodiment.

FIG. 4 is a block diagram of a drive system including paralleled drives in an exemplary embodiment. As shown in FIG. 4, two drives 30 and 30' are connected in parallel to provide drive signals to motor 21. Each drive 30 and 30' is controlled by a separate drive controller, 60 and 62, respectively. Drive controllers 60 and 62 provide control signals to the drives 30 and 30', respectively, to control generation of the drive signals to motor 21. Drive controllers 60, 62 may be implemented using a general-purpose microprocessor executing a computer program stored on a storage medium to perform the operations described herein. Alternatively, drive controllers 60, 62 may be implemented in hardware (e.g., ASIC, FPGA) or in a combination of hardware/software.

Drives 30 and 30' are 2 level, 3 phase drives, such as that shown in FIG. 2. Drives 30 and 30' are placed in parallel by electrically connecting the positive DC bus 34 of drive 30 to the positive DC bus 34 of drive 30' and electrically connecting the negative DC bus 36 of drive 30 to the negative DC bus 36 of drive 30'. The 3 phase drive signals from drives 30 and 30' are connected to an inductive interface 70, which combines each respective phase from the drives 30 and 30' through inductive elements (e.g., inductors). For example, phase W from drive 30 and phase W from drive 30' are connected to each other through separate inductive elements in the inductive interface 70, and then applied to one winding of 3-phase motor 21. Phases V and U are connected in a similar manner. Inductive interface 70 allows for combining phases from two separate drives 30 and 30'. Inductive interface 70 also acts as a voltage suppression filter. Although two drives 30 and 30' are shown in FIG. 4, it is understood that embodiments may include more than two drives connected in parallel.

Figure 5:
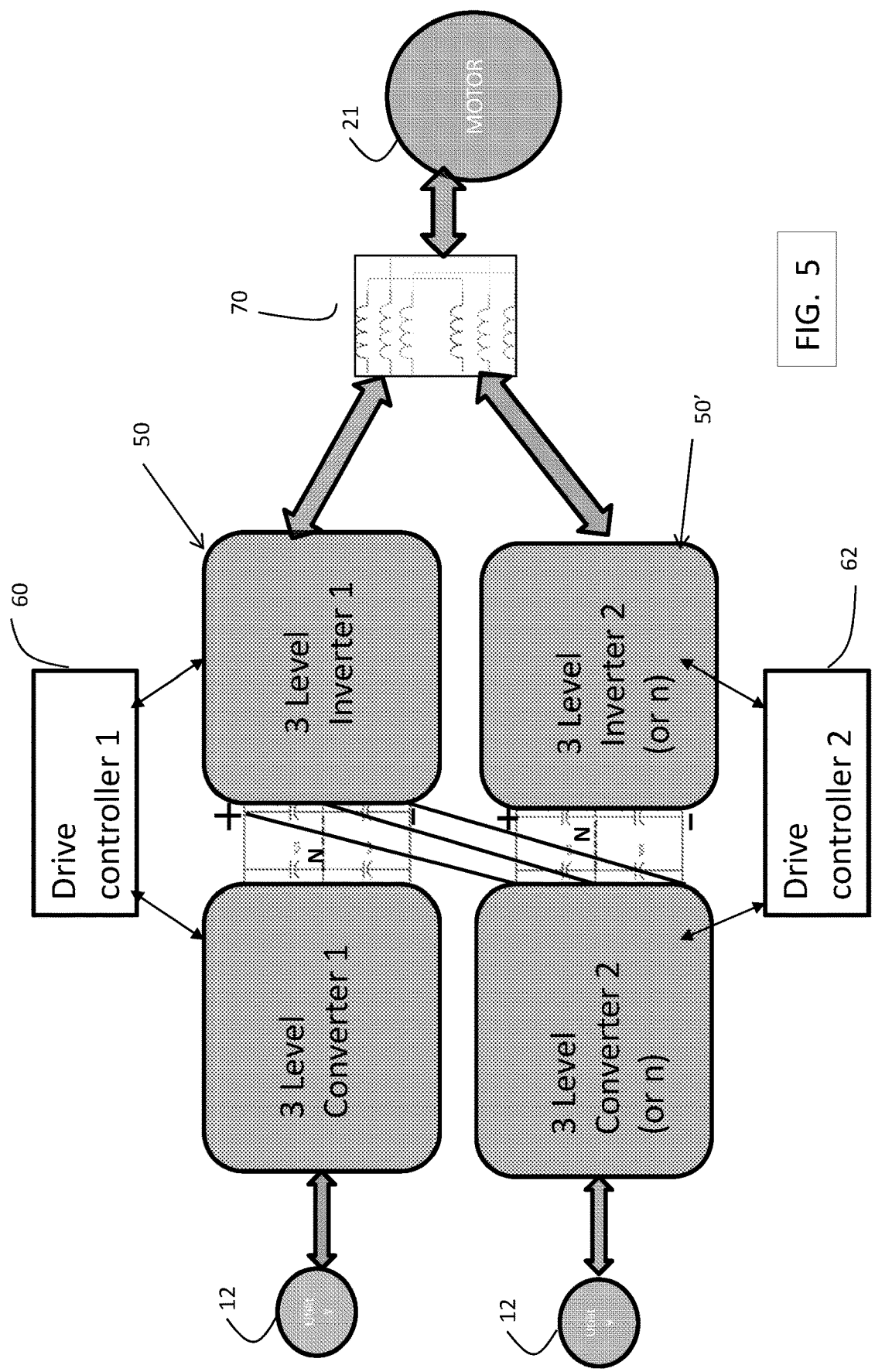
FIG. 5 is a block diagram of a drive system including paralleled drives in an exemplary embodiment.

FIG. 5 is a block diagram of a drive system including paralleled drives in an exemplary embodiment. As shown in FIG. 5, two drives 50 and 50' are connected in parallel to provide drive signals to motor 21. Each drive 50 and 50' is controlled by a separate drive controller, 60 and 62, respectively. Drive controllers 60 and 62 provide control signals to the drives 50 and 50', respectively, to control generation of the drive signals to motor 21.

Drives 50 and 50' are 3 level, 3 phase drives, such as that shown in FIGS. 3A-3C. Drives 50 and 50' are placed in parallel by electrically connecting the positive DC bus 34 of drive 50 to the positive DC bus 34 of drive 50' and electrically connecting the negative DC bus 36 of drive 50 to the negative DC bus 36 of drive 50'. Further, the inverter neutral point 55 of drive 50 is connected to converter neutral point 53 of drive 50'. Alternatively, the converter neutral point 53 of drive 50 is connected to inverter neutral point 55 of drive 50'. In other embodiments, the connection between the inverter neutral point 55 (converter neutral point 53) of drive 50 to the converter neutral point 53 (inverter neutral point 55) of drive 50' may be eliminated, and only the DC buses connected between drives 50 and 50'.

The 3 phase drive signals from drives 50 and 50' are connected to an inductive interface 70, which combines each respective phase from the drives 50 and 50' through inductive elements. For example, phase W from drive 50 and phase W from drive 50' are connected to each other through separate inductive elements in the inductive interface 70, and then applied to one winding of 3-phase motor 21. Phases V and U are connected in a similar manner. Inductive interface 70 allows for combining phases from two separate drives 50 and 50'. Although two drives 50 and 50' are shown in FIG. 5, it is understood that embodiments may include more than two drives connected in parallel.

Figure 6:
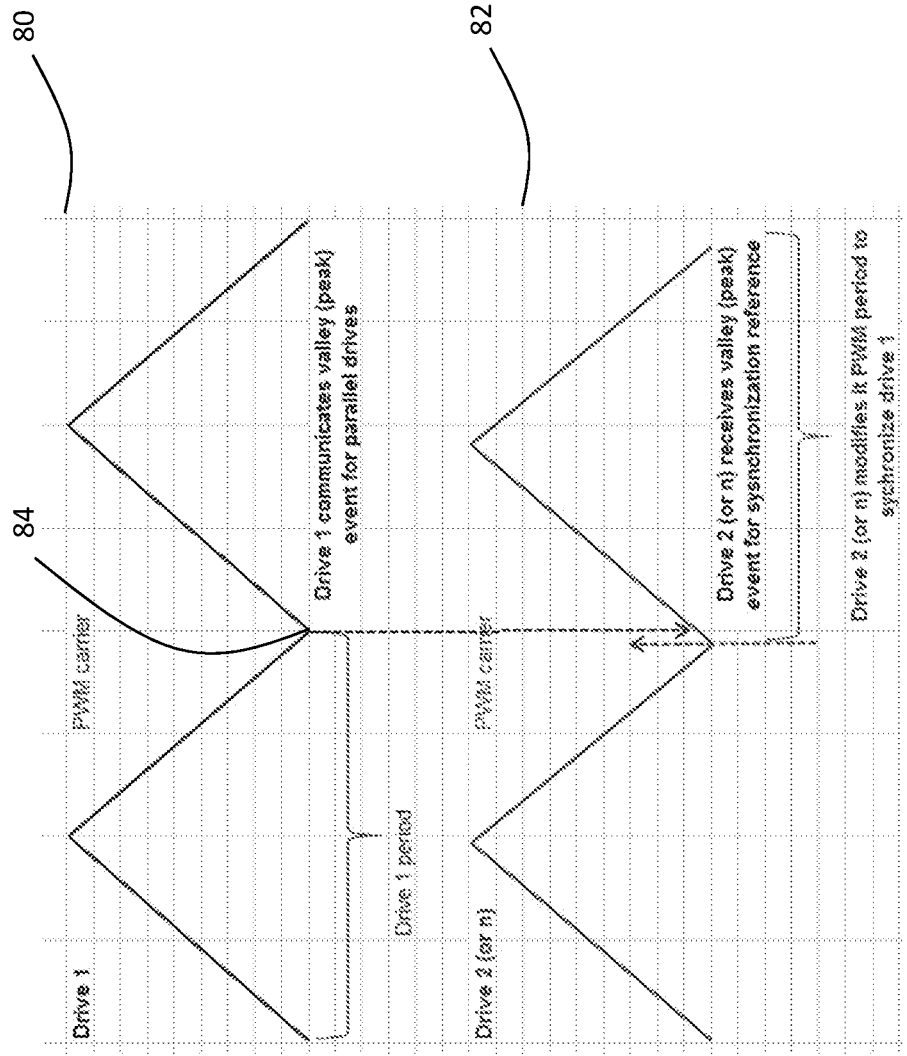
FIG. 6 depicts synchronization of control signals between a first drive and a second drive in an exemplary embodiment.

To facilitate combining the drive signals of separate drives (e.g., 30/30' or 50/50') at the inductive interface 70, it is beneficial that the drive signals at the output of the drives be synchronized. Due to variations in the drive controllers and drives, using identical control signals may not result in synchronized outputs from the drives. In order to aid in synchronizing the outputs from two or more drives, drive controllers 60 and 62 execute a process to align the control signals provided to the respective drives. FIG. 6 depicts a first control signal 80 from drive controller 60 for one phase of the inverter 40 of drive 30, for example, and a second control signal 82 from drive controller 62 for one phase of the inverter 40 of drive 30', for example. The control signals may be pulse width modulation signals, commonly used in n-level drives. In operation, a reference point 84 of the control signal is defined. As shown in FIG. 6, the reference point 84 is a minimum value of the control signal, however, any reference point may be used. During operation, first drive controller 60 communicates to the second drive controller 62 when the reference point has occurred in control signal 80. Second drive controller 62 then determines when the reference point occurs in control signal 82. If there is a difference between when the reference point occurs in the first control signal 80 and when the reference point occurs in the second control signal 82, then one or both of the drive controllers 60 and 62 may adjust the period of the drive signal such that the reference points occur at the same time. The first drive controller 60 or second drive controller 62 may use known techniques to adjust the period of the drive signal, such as a phase locked loop technique to reduce error between when the reference point occurs in control signal 82 and when the reference point occurs in control signal 84. This improves synchronization of the drive signals between drives 30 and 30', which allows smaller inductive elements to be used in inductive interface 70. The control signal synchronization of FIG. 6 may be used with any number of drives, and is not limited to two drives. The control signal synchronization of FIG. 6 may be used with the drives other than those shown in FIG. 4.

Figure 7:
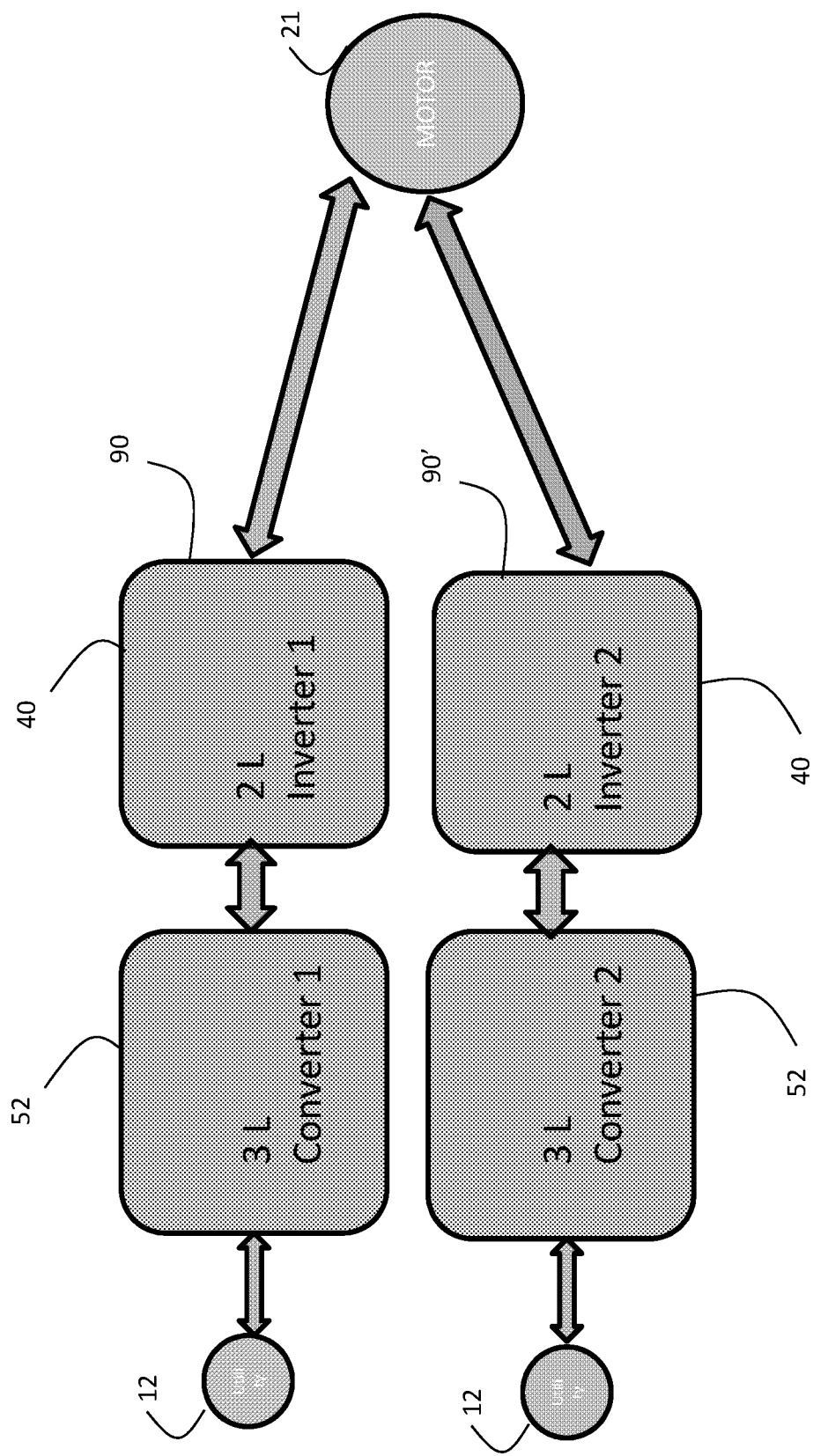
FIG. 7 is a block diagram of a drive system including paralleled drives in an exemplary embodiment.

FIG. 7 is a block diagram of a drive system including paralleled drives in an exemplary embodiment. Drive controllers 60 and 62 may be used in the embodiment of FIG. 7 to control drives 90 and 90'. FIG. 7 depicts the use of hybrid drives 90 and 90', where the converter sections are 3 level, 3 phase converters 52 and the inverter sections are 2 level, 3 phase inverters 40. FIG. 7 also depicts an architecture that does not use an inductive interface 70. In FIG. 7, motor 21 is a 6 phase motor. Each phase of the 3 phase drive signals from drives 90 and 90' is connected to an individual phase of motor 21. Motor 21 may have two (or four) sets of galvanic electrically isolated windings sharing the same stator and generating torque on a common rotor. This architecture can be expanded by adding additional drives and using a motor with a higher number of phases (e.g., 3 three-phase drives with a 9 phase motor, 4 three-phase drives with a 12 phase motor).

Figure 8:
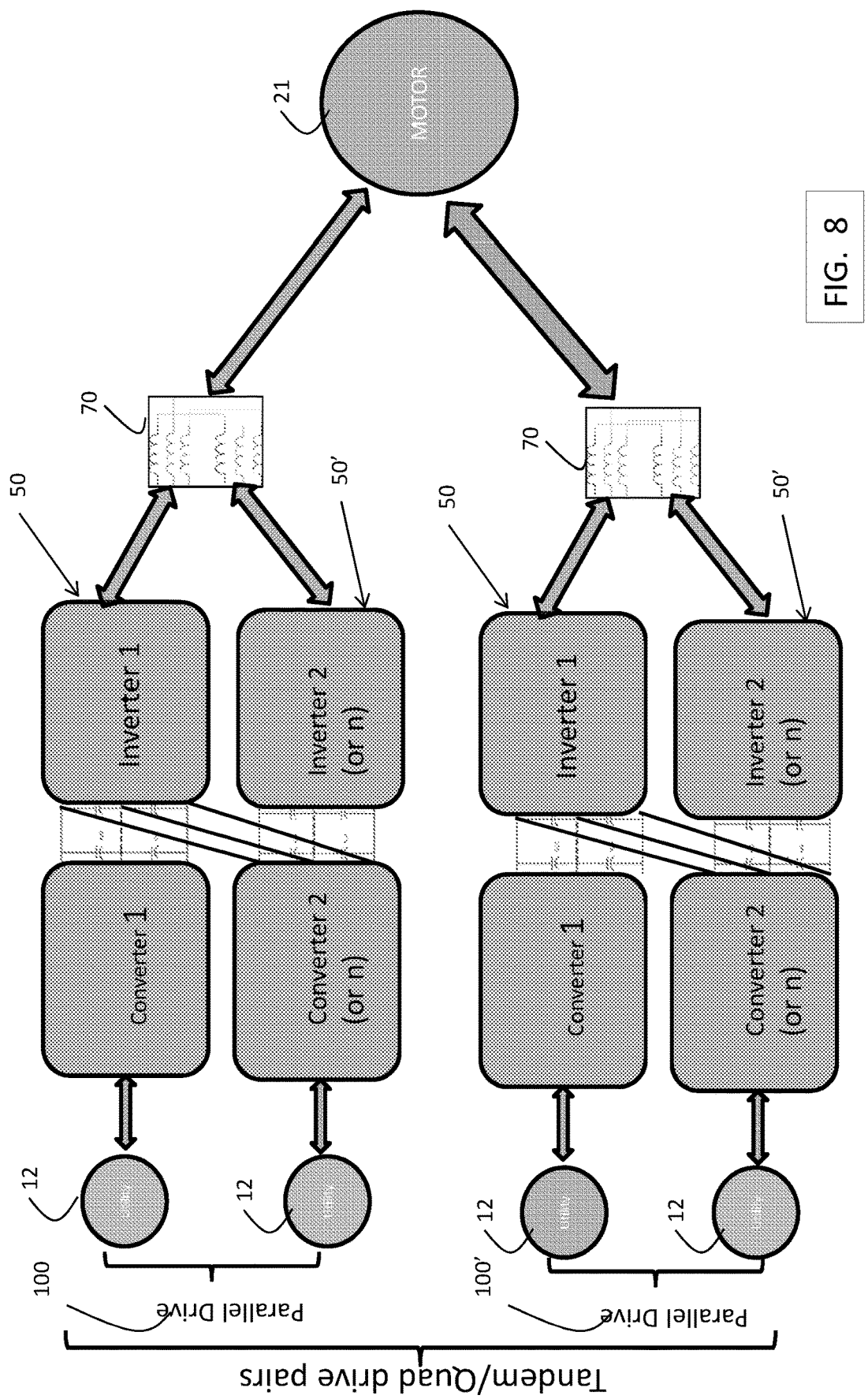
FIG. 8 is a block diagram of a drive system including paralleled drive systems, each including parallel drives, in an exemplary embodiment.

FIG. 8 is a block diagram of an architecture including paralleled drive systems, each including parallel drives, in an exemplary embodiment. FIG. 8 depicts the use of multiple drive systems 100 and 100', each including parallel drives 50 and 50'. Drive controllers 60 and 62 may be used in the embodiment of FIG. 8 to control drives 50 and 50'. In the example of FIG. 8, two drive systems 100 and 100' (each similar to that in FIG. 5) are used to power a 6 phase motor 21. Each drive system 100 and 100' generates a 3 phase drive signal output, where each phase is applied to a winding of motor 21. Motor 21 may have sets of galvanic electrically isolated windings sharing the same stator and generating torque on a common rotor. It is understood that other drive systems may be used in parallel, and embodiments are not limited to the drive system of FIG. 5. Each drive system 100 and 100' may employ control signal synchronization as described with reference to FIG. 6. This architecture can be expanded by adding additional drive systems 100 and using a motor with a higher number of phases (e.g., 3 drive systems with a 9 phase motor, 4 drive systems with a 12 phase motor). In general terms, the system may include N drive systems, with a motor being 3N phase motor.

Figure 9:
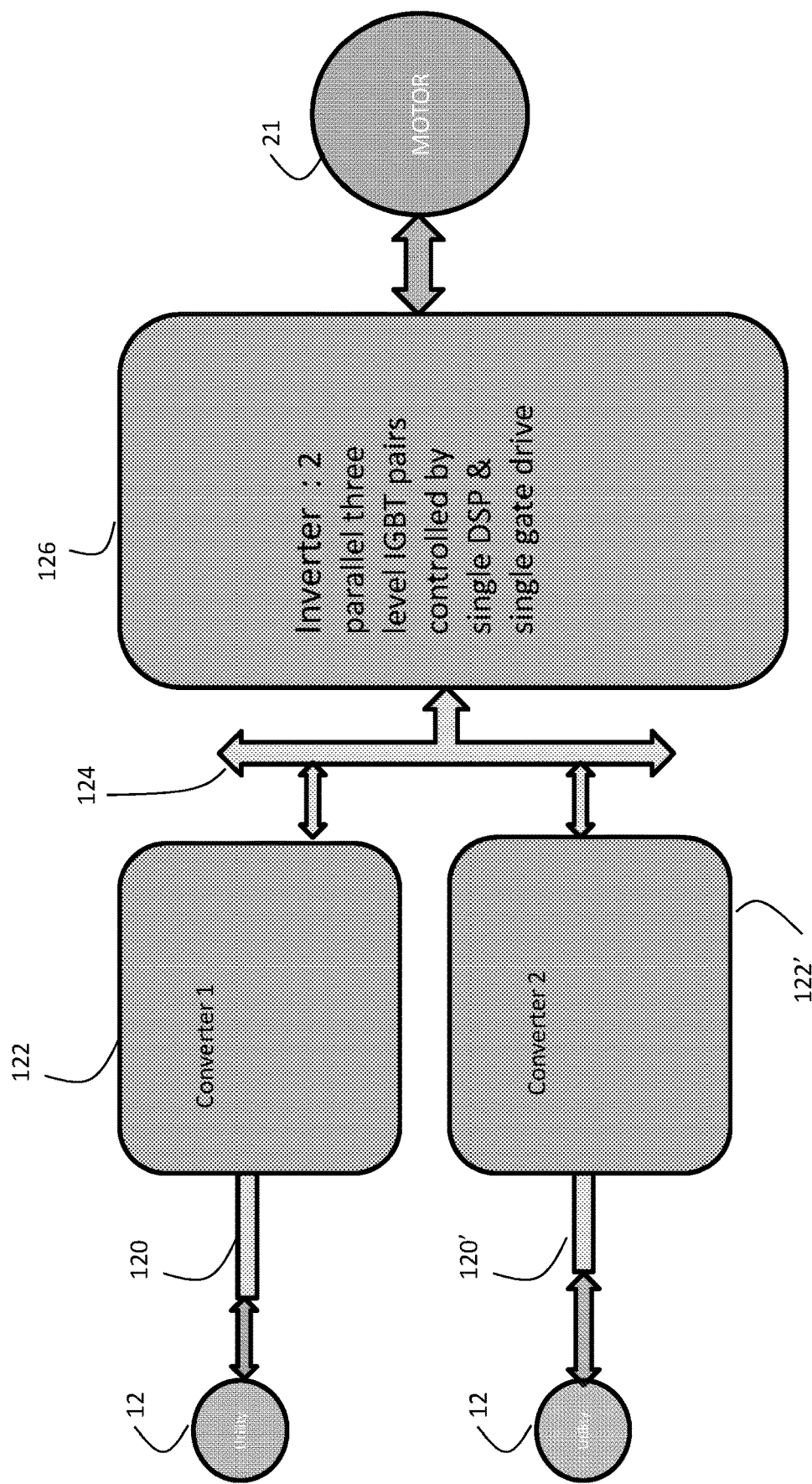
FIG. 9 is a block diagram of a drive system including paralleled converters in an exemplary embodiment.

FIG. 9 is a block diagram of a drive system including paralleled converters and paralleled inverters in an exemplary embodiment. AC power 12 is provided to separate reactors 120 and 120' and then to converters 122 and 122'. The output of converters 122 and 122' is supplied to a DC bus 124, which parallels the positive and negative DC outputs from converters 122 and 122'. An inverter 126 is made up of two parallel, 3 level IGBT inverters controlled by a single controller and single gate drive. The inverters use identical or nearly identical IGBTs, and thus may be controlled by a single controller and gate drive signal, applied to the IGBTs in parallel.

Embodiments include the use of paralleled drives in order to meet high load demands without the need to design or source a single, high power drive. Using parallel drives, and optionally parallel drive systems, allows the drive system to meet load demands through multiple, lower power drives. This eliminates the cost and/or development time associated with a single, higher power drive.

The terminology used herein is for the purpose of describing particular embodiments only and is not intended to be limiting. While the description has been presented for purposes of illustration and description, it is not intended to be exhaustive or limited to the form disclosed. Many modifications, variations, alterations, substitutions, or equivalent arrangement not hereto described will be apparent to those of ordinary skill in the art without departing from the scope of the disclosure. Additionally, while the various embodiments have been described, it is to be understood that aspects may include only some of the described embodiments. Accordingly, embodiments are not to be seen as being limited by the foregoing description, but is only limited by the scope of the appended claims.

The invention claimed is:

1. A conveyance system comprising:
a machine having a motor;
a source of AC power;
a drive system coupled to the source of AC power, the drive system to provide multi-phase drive signals to the motor, the drive system including:
a first drive having a first converter and a first inverter, the first convertor including a first positive DC bus and a first negative DC bus;
a second drive having a second converter and a second inverter, the second convertor including a second positive DC bus and a second negative DC bus;
wherein the first positive DC bus and the second DC positive bus are electrically connected and the first negative DC bus and the second negative DC bus are electrically connected;
an inductive interface coupled to the first inverter and the second inverter, the inductive interface including a plurality of inductive elements, the inductive interface combining drive signals from the first inverter and the second inverter for each phase of the drive signals;
wherein the motor receives the drive signals from the inductive interface.

2. The conveyance system of claim 1, wherein the first converter includes a two level, three phase converter, the first inverter includes a two level, three phase inverter, the second converter includes a two level, three phase converter, and the second inverter includes a two level, three phase inverter.

3. The conveyance system of claim 1, wherein the first converter includes a three level, three phase converter, the first inverter includes a three level, three phase inverter, the second converter includes a three level, three phase converter, and the second inverter includes a three level, three phase inverter.

4. The conveyance system of claim 1 wherein the drive system comprises a first drive controller to provide a first control signal to the first drive and a second drive controller to provide a second control signal to the second drive.

5. The conveyance system of claim 1 wherein the first converter is a three level, three phase converter, the first inverter is a two level, three phase inverter, the second converter is a three level, three phase converter, the second inverter is a two level, three phase inverter and the motor is a six phase motor.

6. The conveyance system of claim 1 further comprising:
an elevator car;
the machine to control motion of the elevator car.

7. A conveyance system comprising:
a machine having a motor;
a source of AC power;
a drive system coupled to the source of AC power, the drive system to provide multi-phase drive signals to the motor, the drive system including:
a first drive having a first converter and a first inverter, the first convertor including a first positive DC bus and a first negative DC bus;
a second drive having a second converter and a second inverter, the second convertor including a second positive DC bus and a second negative DC bus;
wherein the first positive DC bus and the second DC positive bus are electrically connected and the first negative DC bus and the second negative DC bus are electrically connected;
wherein the first converter includes a three level, three phase converter, the first inverter includes a three level, three phase inverter, the second converter includes a three level, three phase converter, and the second inverter includes a three level, three phase inverter wherein the first converter includes a first converter neutral point, the first inverter includes a first inverter neutral point, the second converter includes a second converter neutral point, the second inverter includes a second inverter neutral point, the first converter neutral point electrically connected to the first inverter neutral point and the second converter neutral point electrically connected to the second inverter neutral point, wherein the first converter neutral point is not electrically connected to the second inverter neutral point and the first inverter neutral point is not electrically connected to the second converter neutral point.

8. A conveyance system comprising:
a machine having a motor;
a source of AC power;
a drive system coupled to the source of AC power, the drive system to provide multi-phase drive signals to the motor, the drive system including:
  a first drive having a first converter and a first inverter, the first convertor including a first positive DC bus and a first negative DC bus;
  a second drive having a second converter and a second inverter, the second convertor including a second positive DC bus and a second negative DC bus;
wherein the first positive DC bus and the second DC positive bus are electrically connected and the first negative DC bus and the second negative DC bus are electrically connected;
wherein the first converter includes a three level, three phase converter, the first inverter includes a three level, three phase inverter, the second converter includes a three level, three phase converter, and the second inverter includes a three level, three phase inverter;
wherein the first converter includes a first converter neutral point, the first inverter includes a first inverter neutral point, the second converter includes a second converter neutral point, the second inverter includes a second inverter neutral point, wherein at least one of (i) the first converter neutral point is electrically connected to the second inverter neutral point and (ii) the first inverter neutral point is electrically connected to the second converter neutral point.

9. The conveyance system of claim 8, further comprising a neutral point link electrically connecting the first converter neutral point to the first inverter neutral point.

10. The conveyance system of claim 9, further comprising a second neutral point link electrically connecting the second converter neutral point to the second inverter neutral point.

11. A conveyance system comprising:
a machine having a motor;
a source of AC power;
a drive system coupled to the source of AC power, the drive system to provide multi-phase drive signals to the motor, the drive system including:
  a first drive having a first converter and a first inverter, the first convertor including a first positive DC bus and a first negative DC bus;
  a second drive having a second converter and a second inverter, the second convertor including a second positive DC bus and a second negative DC bus;
wherein the first positive DC bus and the second DC positive bus are electrically connected and the first negative DC bus and the second negative DC bus are electrically connected;
wherein the drive system comprises a first drive controller to provide a first control signal to the first drive and a second drive controller to provide a second control signal to the second drive;
wherein the first drive controller communicates a location of a reference point in the first control signal to the second drive controller, the second drive controller adjusting a period of the second control signal in response to the location of the reference point in the first control signal.

12. The conveyance system of claim 11 wherein the reference point in the first control signal corresponds to point in a PWM control signal.

13. The conveyance system of claim 11 the second drive controller adjusts the period of the second control signal using a phase locked loop.

14. A conveyance system comprising:
a machine having a motor;
a source of AC power;
a drive system coupled to the source of AC power, the drive system to provide multi-phase drive signals to the motor, the drive system including:
  a first drive having a first converter and a first inverter, the first convertor including a first positive DC bus and a first negative DC bus;
  a second drive having a second converter and a second inverter, the second convertor including a second positive DC bus and a second negative DC bus;
  wherein the first positive DC bus and the second DC positive bus are electrically connected and the first negative DC bus and the second negative DC bus are electrically connected;
a second drive system coupled to the source of AC power, the second drive system to provide multi-phase drive signals to the motor, the second drive system including:
  a further first drive having a further first converter and a further first inverter, the further first convertor including a further first positive DC bus and a further first negative DC bus;
  a further second drive having a further second converter and a further second inverter, the further second convertor including a further second positive DC bus and a further second negative DC bus;
  wherein the further first positive DC bus and the further second DC positive bus are electrically connected and the further first negative DC bus and the further second negative DC bus are electrically connected;
the motor to receive the drive signals from the further first drive and the further second drive.

15. The conveyance system of claim 14 further comprising:
a first inductive interface coupled to the first inverter and the second inverter, the first inductive interface including a plurality of inductive elements, the first inductive interface combining drive signals from the first inverter and the second inverter for each phase of the drive signals; and
a second inductive interface coupled to the further first inverter and the further second inverter, the second inductive interface including a plurality of inductive elements, the second inductive interface combining drive signals from the further first inverter and the further second inverter for each phase of the drive signals;

wherein the motor receives drive signals from the first inductive interface and the second inductive interface.

16. The conveyance system of claim 15 wherein:

the first inductive interface generates three phase drive signals;

the second inductive interface generates three phase drive signals; and the motor has at least six phases.

17. The conveyance system of claim 14 wherein:

the motor is a 6 phase motor, the first drive system providing three phase drive signals and the second drive system providing an additional three phase drive signals.

18. The conveyance system of claim 14 wherein:

the number of drive systems comprises N drive systems, the motor being a 3N phase motor.

* * * * *